United States Patent [19]

Tanigami et al.

[11] Patent Number: 5,102,692
[45] Date of Patent: Apr. 7, 1992

[54] METHOD FOR REPAIRING A HIGH-SOLID METALLIC COATING

[75] Inventors: Hajime Tanigami; Kazuhiko Kobayashi, both of Osaka; Yoshio Tanimoto, Hiroshima; Tadamitsu Nakahama, Hiroshima; Hiroyuki Uemura, Hiroshima, all of Japan

[73] Assignees: Nippon Paint Co., Ltd., Osaka; Mazda Motor Corporation, Hiroshima, both of Japan

[21] Appl. No.: 559,281

[22] Filed: Jul. 27, 1990

[30] Foreign Application Priority Data

Aug. 11, 1989 [JP] Japan .................. 1-208915

[51] Int. Cl.$^5$ .............................. B05D 1/36
[52] U.S. Cl. ................... 427/142; 427/388.2; 427/409
[58] Field of Search ............ 427/142, 388.2, 409, 427/419.5, 388.1, 407.1

[56] References Cited

U.S. PATENT DOCUMENTS

| | | | |
|---|---|---|---|
| 3,988,494 | 10/1976 | McAdow | 427/409 |
| 4,407,990 | 10/1983 | Hall et al. | 427/142 |
| 4,499,143 | 2/1985 | Panush | 427/409 |
| 4,546,046 | 10/1985 | Etzell et al. | 427/385.5 |
| 4,551,491 | 11/1985 | Panush | 427/409 |
| 4,598,015 | 7/1986 | Panush | 427/419.2 |
| 4,598,020 | 7/1986 | Panush | 427/409 |
| 4,728,545 | 3/1988 | Kurauchi et al. | 427/409 |
| 4,741,932 | 5/1988 | Ichimura et al. | 427/409 |
| 4,753,829 | 6/1988 | Panush | 427/385.5 |
| 4,950,507 | 8/1990 | Miyazaki et al. | 427/419.2 |
| 4,971,841 | 11/1990 | Panush et al. | 427/407.1 |

FOREIGN PATENT DOCUMENTS

| | | | |
|---|---|---|---|
| 2851003 | 5/1979 | Fed. Rep. of Germany | 427/409 |
| 58-17866 | 2/1983 | Japan | |
| 58-119379 | 7/1983 | Japan | |
| 62-30582 | 2/1987 | Japan | 427/409 |

Primary Examiner—Michael Lusignan
Assistant Examiner—Terry J. Owens
Attorney, Agent, or Firm—Wenderoth, Lind & Ponack

[57] ABSTRACT

A method for repairing a high solid metallic coating on car bodies which involves applying at the area to be repaired an undercoat composition based on the same coating composition as used in the baked high solid metallic coating and with specified amounts of melamine resin and isocyanate compound added. the melamine resin having imino and methylol groups and the sum of the imino groups and methylol groups per triazine ring being 2.3 to 3.3, applying onto the undercoat a two-package urethane clear top coat composition on a wet-on-wet basis and finally drying the coats at 80° C. or less.

2 Claims, No Drawings

5,102,692

METHOD FOR REPAIRING A HIGH-SOLID METALLIC COATING

FIELD OF THE INVENTION

The present invention relates to a method for repairing a high solid metalliC Coating. More partiCularly, the invention relates to a method for repairing a high solid metallic enamel coat on a car body.

BACKGROUND TECHNOLOGY

Recently, automobile intermediate and top coatings frequently employ high solid coating compositions for reducing the solvent and assuring a reduction in solvent release in the coatings.

Particularly in the United States, there is a rigorous control by the Environmental Protection Agency which bans the use of automotive coatings other than high solid systems or the equivalent thereof to reduce such solvent release phenomenon.

One of the problems associated with the use of such a high solid finish coating is the difficulty of matching colors in repairing the coatings. This is particularly true when attempting to repair a metallic coating film which has been damaged.

When the car is on the production line of a car manufacturer where it has not yet been fitted with components, interior fittings, etc., it is possible to repair any coating defect with a production coating enamel and bake it on at a high temperature (usually higher than 140° C.). Inasmuch as the same enamel as the production enamel is used for repairing in this manner, there is no remarkable difficulty in matching colors. However, when the fully assembled car is found to have a defective or marred coat after rolling off the production line or in the marketing place, there are several problems involved in repairing the defects with the same baked-on type enamel as used in the production enamel.

Since the repairing process involves application of a high temperature of about 140° C., the component parts and internal fittings vulnerable to such high temperature must be removed in the first place. This dismounting operation is time-consuming and costly.

The use of a touch-up enamel of a cold cure type or room temperature drying type, dissimilar to the production enamel, for repairing would dispense with the tedious dismounting operation but this should present the following two problems.

One of the problems is that it is difficult to obtain a film performance equivalent to the original coating film. In order to assure the same shell coat film performance, it is necessary to select and use an appropriate coating system such as a two-package urethane coating composition.

The second problem is that because such a touch-up coating differs from the original enamel in its cure and drying mechanisms, it is difficult to achieve exact color matching.

Particularly in the case of a metallic enamel, even the use of the same aluminum pigment coating system tends to produce a different shade due to different topological distribution and orientations of aluminum owing to the different cure mechanisms and solvent evaporation rates involved. Furthermore, even if color matching is satisfactory when viewed from one direction, the phenomenon of so-called metamery occurs when viewed from a different direction.

As a means for globally overcoming the above two problems related to color matching and dismounting of parts and fittings, it has been proposed to modify the baked-on enamel system currently used in the production line by some means or other so that no high temperature steps are needed. The reduced temperature, as such, may be as the rule of thumb, 80° C. at which removal of the parts and fittings will not be necessary.

To approach this goal, it has been proposed to add an excess of a melamine compound or add an isocyanate compound to the system to cause it to react with the unreacted-OH groups.

However, in the case of a high solid melamine-acrylic resin coating system, since its formulation includes a low molecular acrylic resin, a low molecular melamine resin and an acid catalyst, the above proposals do not assure the necessary film performance because no sufficient crosslinking reaction takes place at said reduced temperature.

OBJECTS OF THE INVENTION

It is an object of the invention to provide a method for repairing a high solid metallic coating film with improved color matching at low temperature. Other objects and advantages of the invention will become apparent upon an perusal of this specification.

SUMMARY OF THE INVENTION

The present invention is directed to a method for repairing a metallic coating comprising a high solid metalic base coat and a clear top coat, prepared by applying onto a substrate a high solid metallic base coat composition comprising a low molecular weight acrylic resin, a low molecular weight melamine resin, an acid catalyst and pigment, baking the thus obtained coating, applying on said base coat a clear top coat composition and again baking. This method particularly comprises applying at the area to be repaired on the base coat, a touch-up base coat composition comprising (1) the same high solid metallic base coat compositions as used int he original metallic coating, (2) a melamine resin having imino (—NH—) and methylol (—CH$_2$OH) groups, the sum of said imino and methylol groups per triazine ring being 2.3 to 3.3, and (3) an isocyanate compound, the amount of said melamine resin (2) being about 15 to 25% by weight on solid basis of the total weight of the touch-up base coat composition and the amount of said isocyanate compound being sufficient to react with 35 to 45% of hydroxyl groups of the acrylic resin contained in the touch-up base coat composition, applying on said touch-up base coat a two-package urethane touch-up clear top coat composition on a wet-on-wet basis, and finally drying the thus applied coats at a temperature of 80° C. or less. According to the present invention, a touch-up base coat composition and a touch-up clear top coat composition are applied on wet-on-wet basis and thus applied coats are then subjected to drying at 80° C. or less.

As the touch-up base coat composition, a base coat composition originally used in a high solid metallic coating and comprising a low molecular weight acrylic resin, a low molecular weight melamine resin, and acid catalyst and pigments (aluminum pigment, mica pigment and color pigment) is supplemented with a particular melamine resin and an isocyanate compound. The melamine resin to be supplemented or added to the touch-up composition is employed in addition to the melamine resin used in the base coat composition to be repaired, said melamine resin additive containing imino groups and methylol groups in a total number of 2.3 to 3.3 per triazine ring and wherein the amount of sad melamine resin is preferably in a range of about 15 to 25%, most preferably about 20% by weight (on a solid basis) of the total weight of the touch-up base coat composition and the amount of said isocyanate compound should be sufficient to react with 35 to 45%, most preferably 45% of the hydroxyl groups of the acrylic resin in said touch-up base coat composition. Examples of such melamine resins are U-van 122, U-van 125, U-van 128 which are trademarks for melamine resins, manufactured by Mitsui Toatsu chemicals Inc. Cymel 1130 a trademark for melamines manufactured by Mitsui Cyanamid Ltd.) and the like. Examples of appropriate isocyanate compounds are Desmodur N-3390 (NV 90%, NCO 19.4%, which are trademarks for isocyanate compounds manufactured by Sumitomo Bayer Urethane Co, Ltd.), Colonate EH (NV 100%, NCO 21.3%, which is a trademark for an isocyanate manufactured by Nippon polyurethane Co, Ltd.) and the like. After application of this base coat composition, a two-package urethane clear top coat composition is applied on a wet-on-wet basis and the resulting coats are dried.

Since this coating method employs basically the same coating system as in the pre-existing baked-on enamel at a reduced temperature, color matching is naturally facilitated. However, this low-temperature curable resin may not afford sufficiently satisfactory film properties. It has been found that by using a two-package urethane clear coating which is capable of assuring satisfactory film properties in combination with the above undercoat composition, both color matching and adequate film performance can be successfully accomplished.

Heretofore, the following proposals have been made to reduce the baking temperature.

(1) Japanese Patent Application No. 56-117262 (Kokai Publication 58-17866/1983) For facilitating color matching between the metal substrate and the organic substrate, this literature discloses the following method.

A film-coating resin is premixed with a pigment and a small amount of a melamine resin-type curing agent to prepare a coating paste. To a portion of this paste is added a further amount of melamine resin type curing agent to prepare a high temperature cure coating composition for the metal substrate.

To the remaining portion of the paste is added an isocyanate type curing agent to prepare a low temperature cure coating composition for application to the organic substrate.

(2) Japanese Patent Application No. 1567/82 (Kokai Publication No. 33430/84).

For improved color matching between the metal substrate and the organic substrate, a melamine resin type curing agent is mixed into a basal composition comprising a film-forming resin and a pigment for application to the metal substrate while and isocyanate type curing agent is added to said basal composition for application to the organic substrate.

Both the above methods (1) and (2) are intended to assure improved color matching and involve the addition of a melamine to one and an isocyanate to the other. In the case of (1), a melamine resin type curing agent is used for one and a small amount of melamine and an isocyanate are used for the other. In the case of (2), a melamine type curing agent is used for the metal substrate and an isocyanate type curing agent for the organic substrate.

It appears that in either case the curing agent is added in a stoichiometrically equivalent amount with respect to the main resin.

The coating system of the present invention contains, in addition to the equivalent amount of a melamine-type curing agent (and an accelerator), a specified melamine and an isocyanate. In this sense, the invention does not fall into the technical scope of the prior art. An example of the line coating system containing an acid catalyst are as follows.

Base coat

The film-forming crosslinkable resin for the base coat may be an appropriate film-forming polymer containing functional groups capable of reacting with the crosslinking agent to be used, such as hydroxy and carboxy. Thus, a composition based on an acrylic resin, alkyd resin or polyester resin containing such functional groups can be used, although acrylic resin or a system based on acrylic resin is particularly preferred.

Such a resin has a comparatively low molecular weight, e.g. between 1,000 and 4,000 and preferably has a hydroxyl value of 60 to 200 and an acid value of 5 to 30.

The arylic resin is a comparatively low-molecular weight acrylic polymer of the type commonly used in the coating industry. Thus, for example, it may be a polymer of one or more alkyl esters of acrylic acid or methacrylic acid or a copolymer of such a monomer with one or more ethylenically unsaturated monomers and/or functional monomers.

The crosslinking agent is preferably an aminoplast resin. Condensates of formaldehyde with nitrogen-containing compounds such as urea, thiourea, melamine, benzoguanamine, etc. or lower alkyl ($C_{1-4}$) ethers of such condensates are included in this category. Particularly preferred is a melamine formaldehyde condensate. In addition, an aromatic sulfonate such as p-toluenesulfonic acid, dodecylbenzenesulfonic acid, dinonylnaphthalenesulfonic acid, etc. can be used as an acid catalyst and, as a blocking agent for such acid catalyst, a base such as diethylamine, diethanolamine, triethylamine, etc. can also be employed.

In addition, the system may include a solvent, pigment (aluminum pigment, mica pigment, color pigment, etc.), viscosity modifier, and other additives (surface conditioning agent, precipitation inhibitor, antifoam, etc.).

Clear coat

The film-forming resin for the clear coat may be the same as that mentioned for the base coat, and systems based on acrylic resin or methacrylic resin are preferred.

In addition to the above resin, the system generally contains an aminoplast resin, an acid catalyst, a basic substance for blocking the acid catalyst, a solvent, a viscosity modifier and other additives.

These base coat and clear top coat compositions are successively applied on a wet-on-wet basis and baked to give a repair film.

The average film thicknesses of such base and clear coats are 15 to 25 $\mu$ and 30-50 $\mu$, respectively.

The following examples are further illustrative of the invention. In the Examples, and throughout the specification generally, the term "parts" means "parts by weight".

Standard Base coat composition

Into a stainless steel vessel, the following were placed and the content was stirred by means of laboratory mixer to obtain a coating composition.

EXAMPLES 1-4 AND COMPARATIVE EXAMPLES 1-4

To each 100 parts of the standard base coat composition, the following materials shown in Table 1 were added and stirred well by using a laboratory mixer to obtain a base coat composition, respectively.

TABLE 1

| sum of imino groups and methylol groups | Standard Base Coat comp. | Example | | | | Comparative Example | | | |
|---|---|---|---|---|---|---|---|---|---|
| | | 1 100 | 2 100 | 3 100 | 4 100 | 1 100 | 2 100 | 3 100 | 4 100 |
| 0.6 | Cymel 1130 | | | | | 35 | | | |
| 3.1 | U-122* (NV60) | 33 | 33 | | | | | | 33 |
| 2.6 | U-125* (NV50) | | | 40 | | | | | |
| 2.4 | U-128* (NV60) | | | | 33 | | | | |
| | Colonate EH | 5.3 | | 5.3 | 5.3 | | 5.3 | | |
| | D-N-3390 | | 5.3 | | | | | | |
| | Catalyst 4040 | | | | | | | 1.4 | |

*melamine resins, manufactured by Mitsui Toatsu
In the table, the numbers represent the parts of the various components added

| | |
|---|---|
| ACR 526 varnish | 55.0 parts |
| (Trademark for an acrylic resin manufactured by Nippon Paint Co., NV 78%, Mn 2000, OHV 100, acid value 20) | |
| Cymel 1130 | 47.7 parts |
| (trademark for a melamine resin manufactured by Cyanamide, NV 90%) | |
| Solvesso 100 | 15.0 parts |
| (Trademark for a aromatic hydrocarbons, Esso) | |
| Catalyst 4040 | 3.75 parts |
| (Trademark a catalyst manufactured by Mitsui Toatsu, acidic catalyst) | |
| triethyl amine | 0.5 parts |
| coloring pigment | |

Standard Clear Coat Composition

Into a stainless steel vessel, the following were placed and the content was stirred by means of laboratory mixer to obtain a coating composition.

| | |
|---|---|
| ACR 575 varnish | 62.5 parts |
| (trademark for an acrylic resin manufactured by Nippon Paint Co., NV 75%, Mn 2000, OHV 100, acid value 20) | |
| Nicalac MX-45 | 50.0 parts |
| (trademark of Sanwa Chem. Co., melamine resin NV 100%) | |
| Tinubin 900 | 3.0 parts |
| (trademark for a UV absorber, manufactured by Ciba-Geigy) | |
| Sanol LS 440 | 1.0 parts |
| (trademark of Sankyo sha, antioxidant) | |
| Catalyst 4040 | 2.5 parts |
| diisopropanolamine | 1.5 parts |
| | 120.5 parts |

Each base coat composition was diluted with the following mixed solvent to a No. 4 Ford cup viscosity of 14 sec./20° C.

The thus obtained diluted composition was applied on a tinplate previously degreased by solvent washing in a dry film thickness of 15 μ and after leaving it at room temperatures for 10 minutes, 2 liquid type urethane clear composition (Nax Mightylac G-II clear a trademark for a urethane composition, manufactured by Nippon Paint Co.) was applied on a wet-on-wet basis onto thus obtained coating in a dry film thickness of 40-50 μ.

Thereafter, the coatings were, after leaving at room temperature for 15 minutes, subjected to baking in a drier maintained at 80° C. for 30 minutes.

After standing for 72 hours, thus obtained coated plate was subjected to the following tests.

Preparation of standard coated plate

The abovementioned standard base coat composition was diluted with a thinner to a No. 4 Ford cup viscosity of 14 sec./20° C.

The diluted coating composition was applied on a tinplate previously degreased by solvent washing in a dry film thickness of 15 μ and allowed to stand at room temperatures for 10 minutes Separately, the standard clear coat composition was diluted with Solvesso 100 to No. 4 Ford cup viscosity of 30 seconds. This was then applied on the abovementioned coating on a wet-on-wet basis in a dry film thickness of 40-50 μ. After standing at room temperatures for 15 minutes, the coatings were baked in a drier maintained at 150° C. for 30 minutes. Thus obtained coated plate was used as a control in the following tests.

TABLE 2

| | Example | | | | Comparative Example | | | | Control Standard base |
|---|---|---|---|---|---|---|---|---|---|
| | 1 | 2 | 3 | 4 | 1 | 2 | 3* | 4 | |
| Added melamine | U-122 | U-122 | U-125 | U-128 | Cymel 1130 | — | — | U-122 | — |
| Added isocyanate | Colonate EH | D-N-3390 | Colonate EH | Colonate EH | — | Colonate EH | — | — | — |
| Applied clear | Nax Mightylac GII Cupper | ← | ← | ← | ← | ← | ← | ← | Standard clear |
| Appearance* | ◯ | ◯ | ◯ | ◯ | X | X | △ | ◯ | ◯ |
| Pencil hardness | HB | HB | F | HB | 6B or less | 6B or less | 3B | 3B | F |
| Water resistance* Color matching properties* | ◯ | ◯ | ◯ | ◯ | X | X | X | X | ◯ |

TABLE 2-continued

| | Example | | | | Comparative Example | | | | Control Standard |
|---|---|---|---|---|---|---|---|---|---|
| | 1 | 2 | 3 | 4 | 1 | 2 | 3* | 4 | base |
| Naked eyes | ○ | ○ | ○ | ○ | X | X | X | Δ | — |
| ΔE | 0.5 | 0.3 | 0.3 | 0.6 | 5.1 | 4.2 | 3.5 | 3.1 | Std. |

Appearance* ... measured by naked eyes ... ○ good, Δ no good, X bad
Water resistance* ... after 3 days dipping test at 50° C., coating was examined ○ ... no change, X ... abnormal (blister, whitening)
Color matching properties* visual examination
○ ... almost no difference with the standard
Δ ... slightly change as compared with the standard
X ... quite different from the folor of standard
ΔE ... color difference measured by using SM color computer Model SM-4 manufactured by Suga Sikenki
*catalyst 4040 was also used in Comparative Example 3.

What is claimed is:

1. A method for repairing a metallic coating including a high solid metallic base coat and a clear top coat, prepared by applying onto a substrate a high solid metallic base coat composition comprising a low molecular weight acrylic resin, a low molecular weight melamine resin, an acid catalyst and pigment, baking thus-obtained coating, applying on said base coat a clear top coat composition and again baking, which comprises applying at the area to be repaired a touch-up base coat composition comprising (1) the same high solid metallic base coat composition as used in the original metallic coating, (2) a melamine resin additive used in addition to the melamine resin used in the original metallic coating, said melamine resin additive having imino (—NH—) and methylol (—CH₂OH) groups, the sum of said imino and methylol groups per triazine ring being 2.3 to 3.3, and (3) an isocyanate compound, the amount of said melamine resin additive being about 15 to 25% by weight on a solid basis in respect to the total weight of the touch-up base coat composition and the amount of said isocyanate compound being sufficient to react with 35 to 45% of the hydroxyl groups in the acrylic resin contained in the touch-up base coat composition, applying on said touch-up base coat a two-package urethane touch-up clear top coat composition on wet-on-wet basis, and finally drying the thus applied coats at a temperature of 80° C. or less.

2. A method according to claim 1, wherein the amount of said melamine resin additive is about 20% by weight of the total weight of the touch-up base coat composition and the amount of said isocyanate compound (3) is present in sufficient amounts to react with about 40% of the hydroxyl groups of the acrylic resin.

* * * * *